United States Patent [19]
Diamond

[11] 3,973,208
[45] Aug. 3, 1976

[54] CAPACITOR DETECTOR DEVICE

[75] Inventor: Donald A. Diamond, Norcross, Ga.

[73] Assignee: Dovey Manufacturing Company, Anderson, Ind.

[22] Filed: Feb. 14, 1975

[21] Appl. No.: 550,111

[52] U.S. Cl. .............................. 328/5; 340/258 B; 331/65
[51] Int. Cl.² ........................................ G08B 13/26
[58] Field of Search ........................ 328/5; 331/65; 340/258 B

[56] References Cited
UNITED STATES PATENTS

| | | | |
|---|---|---|---|
| 3,462,692 | 8/1969 | Bartlett | 328/5 |
| 3,675,051 | 7/1972 | Mioduski | 328/5 X |
| 3,743,865 | 7/1973 | Riechmann | 328/5 X |

*Primary Examiner*—John S. Heyman
*Attorney, Agent, or Firm*—Meyer, Tilberry & Body

[57] ABSTRACT

A capacitor detector device for detecting a change of capacitance in a protected zone, which device comprises an antenna element adapted to be mounted in spaced relationship with a grounded element to define the protected zone between the elements and having a nominal capacitance therebetween, which capacitance is changed upon intrusion of an object to be detected. The device includes an oscillator means for pumping, at a preselected frequency, the grounded element with respect to an internal floating ground of the device, means for connecting the antenna to the floating ground of the device whereby the antenna is capacitively coupled to the pumped ground element and means for detecting changes in the capacitive coupling of selected amounts between the antenna element and the pumped grounded element.

11 Claims, 8 Drawing Figures

CAPACITOR DETECTOR DEVICE

The present invention relates to the art of detecting the intrusion of an object, such as a human body or an unwanted metal object, and more particularly to such a detector which operates on variations in capacitor coupling in a protected zone.

This invention relates primarily to a detector device for use on a machine tool and it will be described with particular reference thereto; however, it is appreciated that the invention has broader applications and may be used in various instances wherein the object to be detected changes the capacitive coupling in a protected zone.

In recent years, there have been several devices developed for detecting the presence of a human body, or part thereof, in an area adjacent a machine tool which area is considered hazardous. These devices often included a pick-up element adjacent the protected zone which element changes the phase or frequency of an oscillator. Other types of pick-up systems have been developed. However, these prior devices have been limited by inability to respond accurately over widely varying temperatures and in environments which include ambient radiations such as caused by power lines, generators and electric motors. The present invention is directed to a detector device for monitoring the protected zone which is somewhat insensitive to temperature changes and is not affected by normal random radiation.

In accordance with the present invention, there is provided a capacitor detector device for detecting the change of capacitance in a protected zone, which device comprises an antenna element adapted to be mounted in spaced relationship with a grounded element to define the protected zone between the elements and having a nominal capacitance therebetween, which capacitance is changed upon intrusion of an object to be detected. In accordance with the invention, this device includes an oscillator means for pumping at a preselected frequency the grounded element with respect to an internal floating ground of the device itself, means for connecting the antenna to the floating ground of the device, whereby the antenna is capacitively coupled to the pumped grounded element, and means for detecting changes in the capacitive coupling of selected amounts between the antenna element and the pumped grounded element. The term "pumped" is well known in the electronic art and indicates that the internal voltages of the device fluctuate around the grounded element so that the grounded element appears to be oscillating when electrically viewed from internal voltages of the device itself. The internal voltages, which are actually oscillating, appear to be steady state and include a ground potential and a positive D.C. potential. This internal ground is considered floating in accordance with normal electrical technology and when viewed by the internal circuitry of a device appears to be steady state whereas the actual earth grounded element defining the protected zone appears to be oscillating. In this manner, the antenna which is connected to the circuitry of the device electrically views the earth grounded element as a relatively oscillating component. Changes in the capacitance within the protected zone are detected as variations in the pick-up of the antenna. In this manner, the antenna is a passive element and does not radiate. It receives an oscillating, capacitively controlled signal from the grounded element which is a earth ground, pumped element. By this pumping action, the earth grounded element becomes the apparent active element of the protected zone. By providing a passive antenna or pick-up device which is connected internally of the circuitry of the detector which appears to have steady state voltages, a variety of frequencies can be selected for the operation of the detector. In accordance with the preferred embodiment of the invention, the grounded element is pumped by an oscillator which has a frequency of approximately 5–8 kilohertzs. This is a quiet zone in a manufacturing plant since most random frequencies in such plants include 60 cycle for normal line currents, 3,000 cycle for low frequency equipment, and 10 to 400 kilocycles high frequency equipment. By selecting a frequency in the general range of 5–8 kilohertz and preferably in the range of 6–7 kilohertz, the device, in accordance with the present invention, operates in a frequency band which is not affected by the random noise of the plant itself.

The primary object of the present invention is the provision of a capacitor detector device, which device is generally uniform in operation and is not affected by random frequency produced by electrical equipment used in a manufacturing plant.

Another object of the present invention is the provision of a capacitor detector device of the type described above, which device operates at varying ambient temperatures and includes a fail safe feature.

Another object of the present invention is the provision of a capacitor detector device of the type described above, which device includes a passive antenna element which does not radiate to its surroundings.

Yet another object of the present invention is the provision of a capacitor detector device of the type described above, which device is economical to produce and can be easily manufactured and is consistent in its operating characteristics.

These and other objects and advantages will become apparent from the following description taken together with the accompanying drawings in which.

Figure 1:
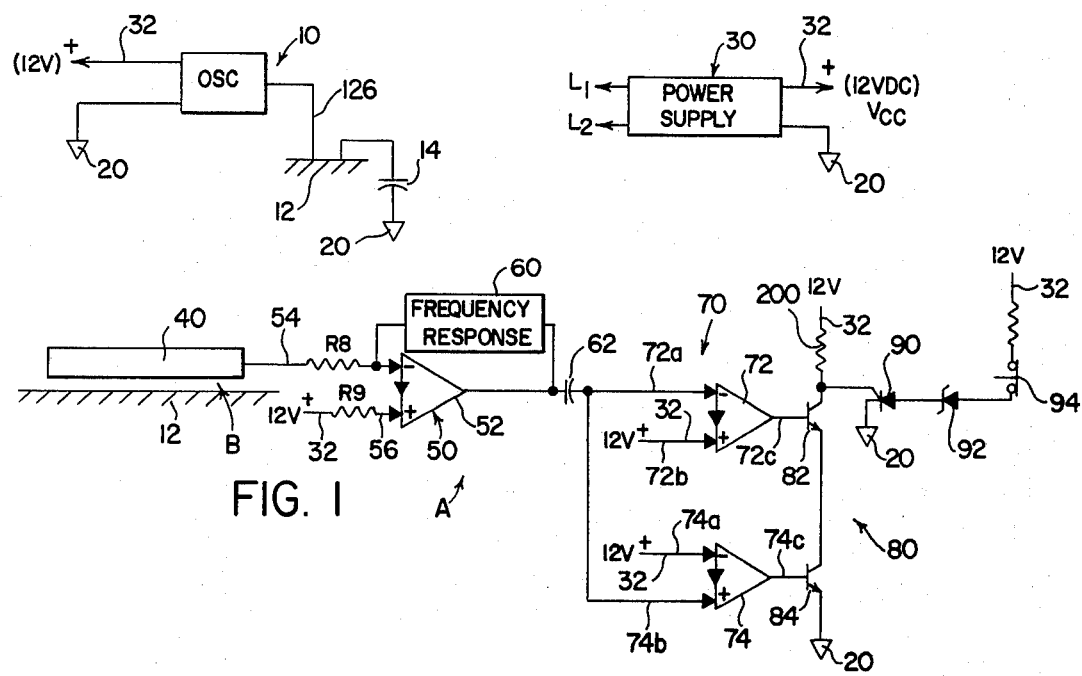
FIG. 1 is a schematic diagram illustrating certain features of the preferred embodiment of the present invention.
Figure 2:
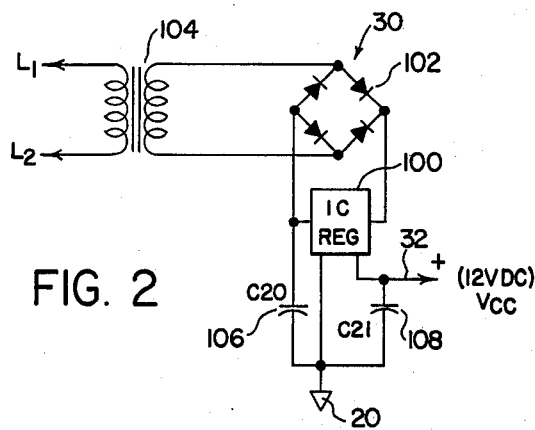
FIG. 2 is a wiring diagram illustrating, somewhat schematically, the regulated power supply of the preferred embodiment of the invention.

Referring now to the drawings wherein the showings are for the purpose of illustrating a preferred embodiment of the invention only and not for the purpose of limiting same, FIG. 1 shows a capacitor detector device A for detecting an object which can change the capacitive coupling between a first element subjected to an alternating voltage and a second element capacitively coupled thereto. Device A includes an oscillator 10 connected to earth ground element 12 which is a part of the machine to be monitor at a protected zone B. The oscillator pumps the earth grounded metal, conductive element 12 so that the inputs of the oscillator are oscillated with respect to earth ground in a manner to be described later. Capacitor 14 is coupled between earth ground and the internal or instrument ground 20 to shunt any noise in the earth ground to instrument ground and this compensates for random noise. The power supply 30, which is best shown in FIG. 2, includes input lines $L_1$, $L_2$ and a positive output 32 which is regulated at a 12 volt D.C. level above the instrument ground 20. The positive line 32 is the $V_{cc}$ line for the device and remains at all times at the regulated value above instrument ground 20. Consequently, the instrument ground and $V_{cc}$ line 32 at the input of oscillator 10 oscillate with respect to earth grounded element 12 at the frequency of the oscillator. In the preferred embodiment of the invention, the controlled oscillator frequency is in the general range of 5–8 kilohertz and preferably in the range of 6–7 kilohertz. This is a quiet frequency zone in manufacturing plants. If a plant or other environment does not have this quiet zone, oscillator 10 can be changed to operate in a quiet zone of a particular environment in which the detector device 20 is being operated. By connecting the output of oscillator 10 to the earth grounded element 12, the floating internal instrument ground 20 and the positive power source line 32 oscillate with respect to ground at the frequency of oscillator 10.

Antenna 40 is capacitively coupled with the earth grounded element 12 to define the protected zone B, which zone has a nominal coupling capacitance when there has been no intrusion of an object to be detected. The zone B is defined by the spacing between the antenna and the grounded element 12 which spacing is, in practice, approximately 6 inches, although this spacing may be varied in certain applications. The term antenna used in this application indicates a pick-up device which is subjected to the pumped grounded element 12. The antenna does not radiate and is not part of a tank circuit of an oscillator. Antenna 40 produces a control signal which has a frequency determined by oscillator 10, which frequency is passed through a pass band detector 50 having a Norton type differential amplifier 52 with an inverted input 54 and a non-inverted input 56 in accordance with normal practice. A frequency responsive network 60 is coupled between the output of amplifier 52 and the inverted input to provide a frequency response for the frequency of oscillator 10. Other frequencies are attenuated by the network 60 in accordance with normal pass band technology. The other input 56 of differential amplifier 52 provides a bias so that the output of amplifier 52 oscillates about an intermediate voltage level at the frequency of oscillator 10. This provides a more defined oscillating output for device A. Capacitor 62 couples the pass band detector output to a comparator 70 which includes a high detection Norton differential amplifier 72 having inputs 72a, 72b, and output 72c. A low detection or fail safe detector Norton differential amplifier 74 has inputs 74a, 74b, and an output 74c. Differential amplifiers 72, 74 control an AND gate including transistors 82, 84. The output circuit also includes a SCR 90, LED 92 and a reset switch 94.

When the output of detector 50 is above a selected high level, differential amplifier 72 is turned off to deactivate the AND gate. This initiates the output circuit, in a manner to be described in more detail with respect to FIG. 3, and renders SCR 90 conductive. Thus, LED 92 is lighted. The LED can be turned off by opening switch 94.

In accordance with the preferred embodiment of the invention, floating instrument ground 20 and $V_{cc}$ line 32 are maintained at a regulated voltage differential which, in the preferred embodiment, is 12 volts D.C. A variety of regulated power supplies could be used for this purpose. Such a device is schematically illustrated in FIG. 2 wherein an integrated circuit (IC) regulating chip 100 is employed to provide voltage regulation between the floating instrument ground 20 and the $V_{cc}$ line 42. The regulated chip 100 is driven by a full wave rectifier 102 connected to the output of transformer 104. Filtering capacitors 106, 108 are connected to the floating ground 20. Other regulated power supplies with a floating ground can be used.

Figure 4A:
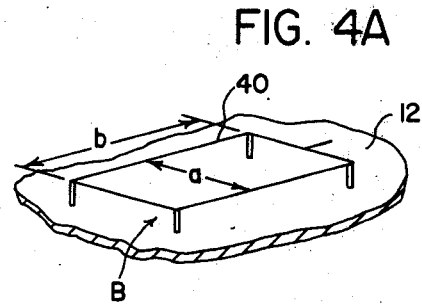
FIG. 4A is a pictorial view illustrating certain characteristics of the antenna shown in FIG. 4.
Figure 4:
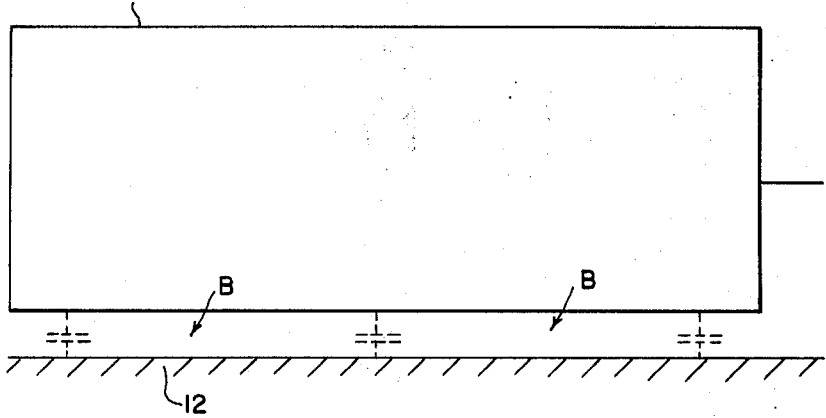
FIG. 4 is a schematic view illustrating the antenna employed in the preferred embodiment of the present invention.

Referring now to FIG. 4, antenna 40 is spaced from earth grounded element 12 to produce a protected zone B. In normal practice the protected zone is defined by an antenna loop which is placed over grounded element 12, as best shown in FIG. 4A. In practice, the width a of antenna 40 is approximately 18 inches or less. Length b of antenna 40 is 10 feet or less. In this manner, the area below and encircled by antenna loop 40 is a protected zone and can be protected by the antenna. The stands holding antenna 40 from grounded element 12, in practice, are approximately 6 inches and are formed from electrically insulated material. Other configurations and shapes can be used for the antenna since it is not a radiating device but is a passive pick-up device. This is a distinct advantage over prior detector devices using radiating antennas or oscillator tank circuits.

Figure 5:
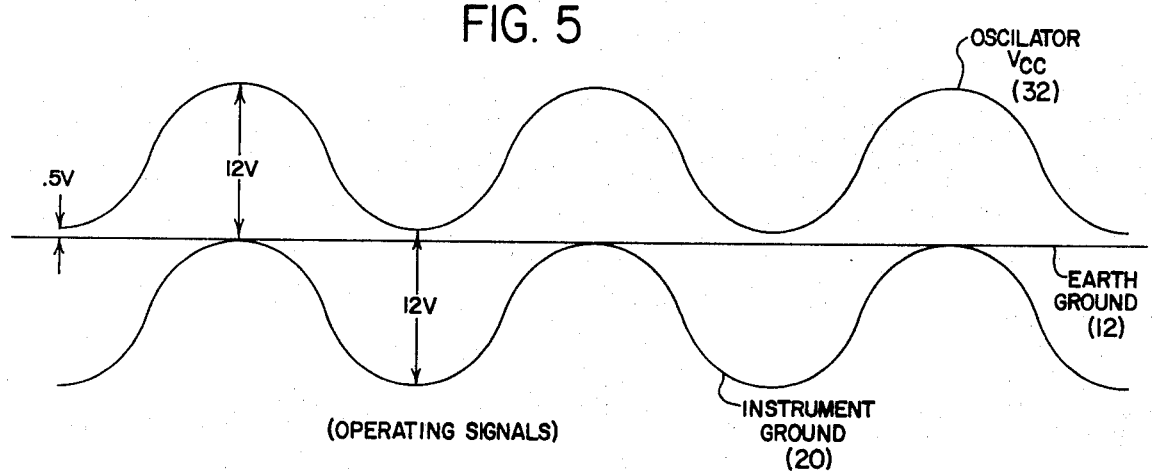
FIG. 5 is a voltage graph schematically illustrating the pumping concept employed in the preferred embodiment of the present invention.

Referring now to FIG. 5, the relationship of the earth grounded element 12 and the internal voltages of device A is illustrated. Oscillator 10 pumps the earth grounded element, which causes the internal positive voltage line 32 and the internal instrument ground line or points 20 to fluctuate about earth ground, as shown in FIG. 5. Because of the regulated power supply, the spacing between the instrument ground and the positive line of the device is the regulated amount, shown as 12 volts D.C. In practice, the $V_{cc}$ line oscillates at an amplitude of approximately 11.5 volts and has a lower level of approximately .5 volts above earth ground. The internal circuitry of detector A is electrically oriented with respect to instrument ground 20 and the $V_{cc}$ line. Thus, the internal circuitry electrically visualizes the instrument ground as a fixed point and the $V_{cc}$ as 12 volts above that point since this is true at all times. Consequently, when viewed from the internal circuitry of device A, it appears that the earth grounded element 12 is oscillating at a frequency determined by the oscillator, which frequency is preferably in the range of 5–8 kilohertz.

Referring again to FIG. 1, the input in line 54 is a control signal determined by the coupling capacitance between antenna 40 and earth grounded element 12. The input 56 of Norton differential amplifier 52 provides a bias for the amplifier. As the coupling between antenna 40 and the earth grounded element changes, the output of amplifier 52 changes by changes in the alternating current signal in input 54. If the amplifier increases substantially to indicate an intrusion by an object to be detected, input 72a exceeds a level determined by the bias of input 72b. This then produces a low voltage in output 72c to turn off transistor 82. This pulls the gate of SCR 90 toward the $V_{cc}$ line 32 and gates the SCR on. Thus, LED 92 is turned on. This light remains actuated since the gate of the SCR cannot stop conduction. To reset the device, switch 94 is opened. This turns off LED 92 if transistors 82, 84 are subsequently conducting indicating a normal operating condition. Of course, the AND gate controls a device for turning off the machine if that function is desired. If the output of differential amplifier 52 is below a given level, which can be caused by circuit failures, the current of input 74b is sufficiently low that it cannot overcome the bias of input 74a. When this happens, the voltage in output 74c is low. This reverse biases transistor 84 to cause the same operation as described in connection with the detection mode of operation.

Figure 3:
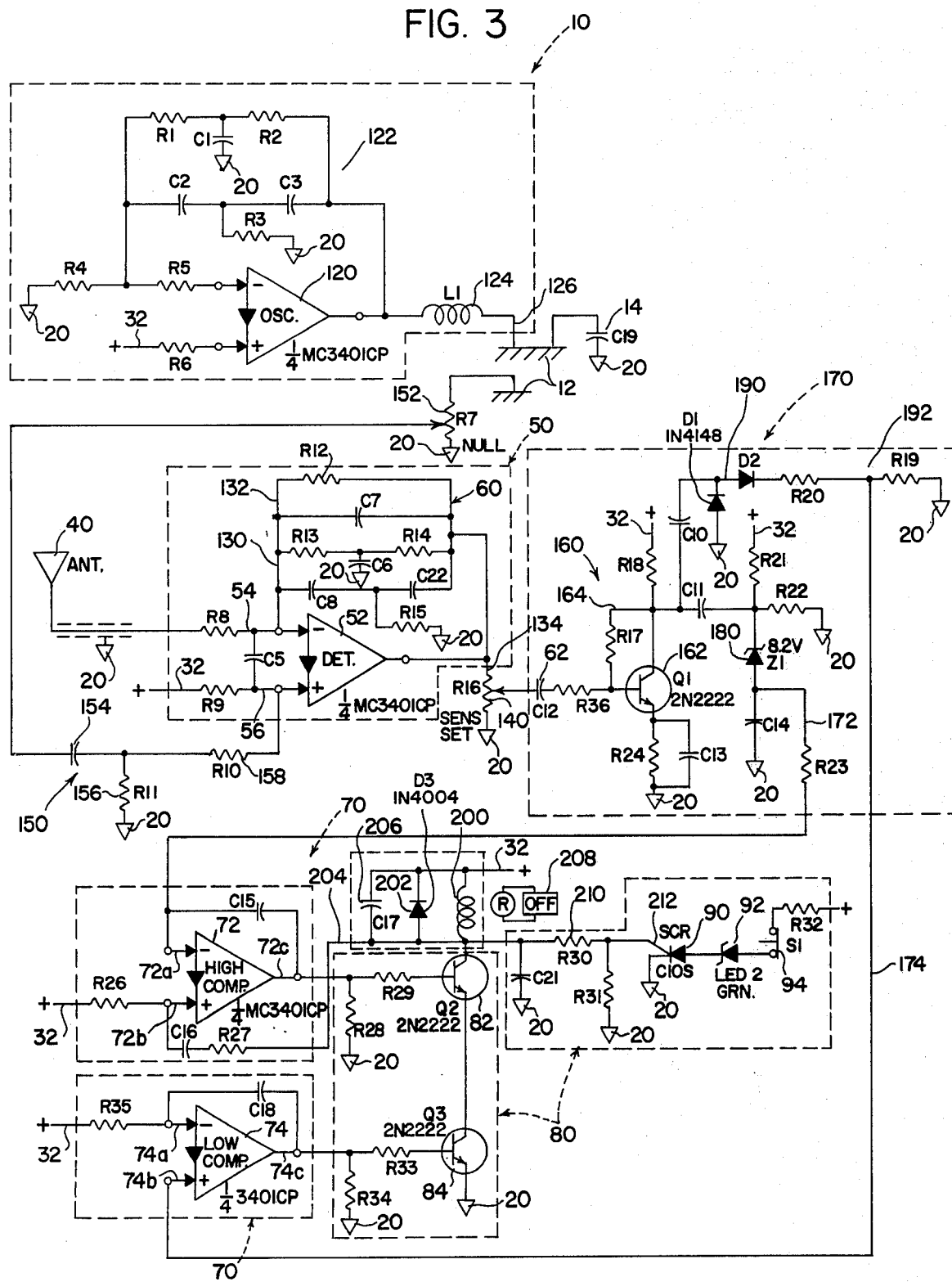
FIG. 3 is a detailed wiring diagram of the preferred embodiment of the present invention.

Referring now to FIG. 3, a more detailed wiring diagram of the preferred embodiment of the present invention is illustrated. This diagram shows the oscillator 10 as including a Norton differential amplifier 120 having a twin T feedback network 122 selected to produce oscillations of a given frequency, preferably in the range of 5–8 kilohertz. An induction choke 124 is employed to prevent ground spikes from entering the oscillating circuit. A line 126 connects the output of oscillator 10 with earth grounded element 12 so that the input lines 20, 32 of the oscillator are oscillated with respect to ground to produce a pumping action of the ground itself. The various resistors, capacitors, diodes are labeled for differentiation; however, the function of only the essential components will be described in detail. The other components have normal operating functions in the general type of circuits illustrated in FIG. 3.

Pass band detector 50 includes a twin T feedback network 130 which is essentially the same as network 122 so that the frequency response of differential amplifier 52 is essentially the same as the frequency of oscillator 10. Also, since all Norton differential amplifiers illustrated in FIG. 3 are part of a single integrated circuit chip, the use of two substantially identical twin T feedback networks produced temperature tracking of pass band detector 50 with an oscillator 10. Parallel resistor R12 and capacitor C7 form a Q suppressant network 132 which prevents self oscillation of the pass band detector 50. In this manner, only the frequency of the oscillator 10 is passed through the pass band detector and there are no oscillations of the amplifier. The rest of the ambient frequencies or noise are attenuated and have no effect on the circuits at the output side of the pass band detector. The pass band detector has an output 134 which is connected to a rheostat or pot 140 which is used to adjust the response or sense level of device A. Input 56 includes a current resistor R9 to produce a current at the non-inverted input of Norton amplifier 52. This input is controlled by the $V_{cc}$ to bias output 134 to a D.C. level allowing basically full wave output. The control signal from antenna 40 is directed into the input 54 through a current creating resistor R8. As the capacitor coupling changes in the protected zone B, the amplitude of the control signal in input 54 changes. This changes the amplitude of the alternating signal directed to rheostat 140. If the change is sufficiently high as controlled by the set point of rheostat 140, it actuates the high detector differential amplifier 72 as explained before. If the amplitude decreases, which can be caused by a failure of the internal circuitry or other extraneous conditions, the amplitude of the signal in output 134 is sufficiently reduced to actuate the low or fail safe differential amplifier 74, as explained before.

In accordance with the preferred embodiment of the invention, pass band detector 50 includes a null circuit 150. This circuit produces a more responsive characteristic at the output of the pass band amplifier. A variety of null circuits could be used; however, in accordance with the illustrated embodiment, a rheostat 152 is connected between earth grounded element 12 and instrument ground 20. This produces a null signal having the frequency of oscillator 10 and a level between earth ground and instrument ground. This null signal is directed through capacitor 154 to remove any D.C. component therefrom. The signal is then connected at the junction of resistors 156, 158. In this manner, an oscillating current is directed to input 56 of differential amplifier 52. This null signal is a current signal and is in phase with the current signal from antenna 40 at input line 54. By adjusting rheostat 152, the two inputs to differential amplifier 52 essentially cancel each other under normal operating conditions with no detected object in protected zone B. The null signal is adjusted to a value slightly below the normal control signal in input 54 to produce an output signal in line 134 of a sufficient value to operate the low or fail safe comparator amplifier 74. Thus, during normal operation, in accordance with the preferred embodiment of the invention, the null circuit 150 is adjusted to produce a slight output in line 134. This allows for operation of the fail safe characteristics of detector device A.

Output 134 is connected by capacitor 62 with a transistor amplifier circuit including a transistor 162 and a biasing network 164 including resistors R17, R18. Emitter resistor R24 and capacitor C13 couple transistor 162 to floating internal instrument ground 20. Transistor amplifier network 160 provides the primary element of the detector network 170, which network has a high control line 172 and a low or fail safe control line 174.

Referring now more particularly to the high control line 172, a voltage divider including resistors R21, R22 is connected between the $V_{cc}$ line and instrument ground 20. Thus, the output from capacitor C11 produces an A.C. signal on a given controlled D.C. level determined by the relative values of resistors R21, R22. An 8.2 volt Zener diode 180 is connected between the output capacitor C11 and instrument ground 20 through a smoothing capacitor C14. As long as the voltage at the output of capacitor C11 does not exceed the Zener diode voltage, line 172 is grounded to instrument ground. When the output of pass band detector 50 exceeds a selected value adjusted by sense adjusting rheostat 140, a high voltage appears at line 172. This voltage is converted to a current signal by resistor R23. Thus, upon detection of an object in protected zone B, current increases in line 172 and at input 72a of differential amplifier 72. Referring now to low or fail safe line 174, a voltage doubler network 190 includes diodes D1, D2. This rectifies the output from capacitor C10 to control the voltage between resistors R19, R20 in a voltage divider 192. The current at the function of resistors R19, R20 is directed in input 74b of Norton differential amplifier 74. During normal operation, a sufficient current is directed through line 174 to overcome the biasing effect at input 74a so that the output 74c remains at a high voltage or high logic. If a defect develops within device A, current in line 174 decreases to produce a low logic in output 74c.

The output controlling AND gate in output circuit 80 includes transistors 82, 84 and is a somewhat standard AND gate arrangement. A relay coil 200 is used to control a relay R. When high voltages appear at outputs 72c, 74c, the transistors are conductive. This grounds coil 200 to the instrument ground and across the $V_{cc}$ line. In this manner, relay R is energized to allow operation of a machine being monitored. Diode 202 commutates the coil 200 to prevent reverse emf. A feedback line 204 including resistor R27 and capacitor 16 is employed to remove ripple noise in the input circuit of the detection amplifier 72. A holding capacitor 206 is connected in parallel with coil 200 to prevent inadvertent fluctuation in the holding operation of the coil. Thus, when the output of pass band detector 50 is beyond the high or low limit, relay coil 200 is deenergized. This drops out relay R and turns off the monitored machine by an appropriate off control 208. To indicate when a detection has been made, output circuit 80 includes SCR 90 and LED 92. An SCR gating circuit 210 includes capacitor C21, resistor R30 and resistor R31. During normal operation, a gating circuit 210 is grounded so SCR 90 is non-conductive. Thus, LED 92 is not lighted. Upon a detection or a fail safe trip operation, the ground through transistors 82, 84 is removed. This raises the input of gating circuit 210 toward the $V_{cc}$ line 32 to a level determined by the resistance of coil 200 and resistors R30, R31. In this manner, gating circuit 210 actuates gate 212 to render SCR 90 conductive. This lights the LED 92. Since gate 212 cannot turn off the SCR, LED 92 remains lighted until reset switch 94 is opened after re-establishment of a normal operating condition for device A. In this manner, an operator can determine that an actuation or detection has been experienced by the condition of the LED 92.

Figure 6:
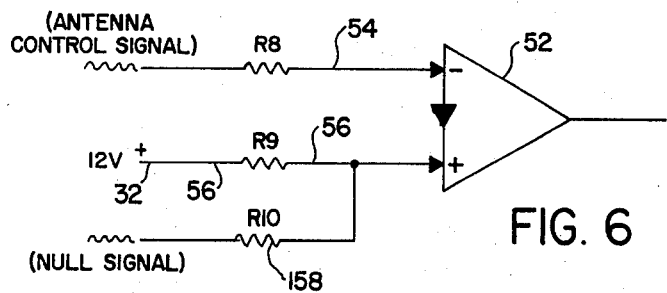
FIG. 6 is a view illustrating the null circuit characteristics of the preferred embodiment of the present invention; and, FIG. 7 is a voltage chart schematically illustrating the null characteristics of the preferred embodiment of the invention as schematically illustrated in FIG. 6.
Figure 7:
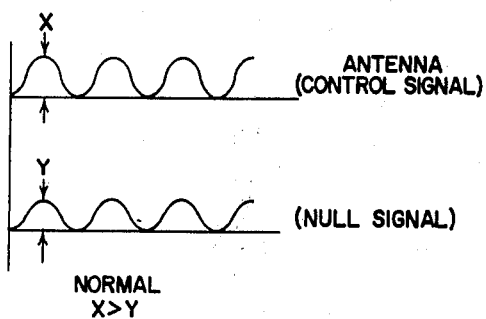

Referring now to FIGS. 6 and 7, these figures schematically illustrate the null characteristic of network 150. The control signal of a given frequency is introduced from the antenna through resistor R8 to the inverted input of Norton differential amplifier 52. In a like manner, a null signal is introduced through resistor R10 to the non-inverted input 56 of the differential amplifier. The two signals are in phase; therefore; by adjusting the amplitude of the null signal, response of the Norton differential amplifier can be increased. The relationship of the phase control signal and null signal are schematically illustrated in FIG. 7. As is apparent in these figures, the control signal itself is really a current sump or source which alternates in accordance with the pumped frequency of the grounded element 12. In this manner, antenna 40 is passive in the detection circuit.

The parameters of certain components used in the preferred embodiment and in FIG. 3 are listed below:

RESISTORS

| | | |
|---|---|---|
| R1 22K ohms | R13 22K ohms | R26 220K ohms |
| R2 22K ohms | R14 22K ohms | R27 6.8K ohms |
| R3 8.2K ohms | R15 8.2K ohms | R28 100K ohms |
| R4 47K ohms | R16 5K ohms POT | R29 10K ohms |
| R5 33K ohms | R17 150K ohms | R30 15K ohms |
| R6 220K ohms | R18 4.7K ohms | R31 1K ohms |
| R7 5K ohms POT | R19 47K ohms | R32 270 ohms |
| R8 27K ohms | R20 56K ohms | R33 10K ohms |
| R9 82K ohms | R21 15K ohms | R34 100K ohms |
| R10 33K ohms | R22 22K ohms | R35 10M ohms |
| R11 15K ohms | R23 4.7K ohms | R36 15K ohms |
| R12 1 Meg ohms | R24 1K ohms | |

CAPACITORS

| | | |
|---|---|---|
| C1 2000 pf | C10 .047 $\mu$f | C17 10 $\mu$f |
| C2 1000 pf | C11 .047 $\mu$f | C18 120 pf |
| C3 1000 pf | C12 8200 pf | C19 15000 pf |
| C5 240 pf | C13 .22 $\mu$f | C20 200 $\mu$f |
| C6 2000 pf | C14 .047 $\mu$f | C21 500 $\mu$f |
| C7 120 pf | C15 1000 pf | C22 1000 pf |
| C8 1000 pf | C16 1000 pf | |

MISCELLANEOUS

| | | |
|---|---|---|
| D1 IN4148 | LED 2 GREEN | IC Reg MC 7812CP (Motorola) |
| D2 IN4148 | Q1 2N 2222 | IC Quad Amp. MC 3401CP |
| D3 IN 4004 | Q2 2N 2222 | |
| Z1 8.2V ZENER | Q3 2N 2222 | |

Having thus defined my invention, I claim:

1. A capacitor detector device for detecting the change of capacitance in a protected zone, said device comprising: an antenna element adapted to be mounted in spaced relationship with a grounded element to define said protected zone between said elements and having a nominal capacitance therebetween which capacitance is changed upon intrusion of an object to be detected; an oscillator means independent of said antenna element for pumping at a preselected frequency said grounded element with respect to an internal floating ground of said device; means for connecting said antenna to said floating ground of said device whereby said antenna is capacitively coupled to said pumped grounded elements; and means for detecting changes in the capacitive coupling of selected amounts between said antenna element and said pumped grounded element.

2. A capacitor detector device for detecting the change of capacitance in a protected zone, said device comprising: an antenna element adapted to be mounted in spaced relationship with a grounded element to define said protected zone between said elements and having a nominal capacitance therebetween which capacitance is changed upon intrusion of an object to be detected; an oscillator means for pumping at a preselected frequency said grounded element with respect to an internal floating ground of said device;

means for connecting said antenna to said floating ground of said device whereby said antenna is capacitively coupled to said pumped grounded elements; and means for detecting changes in the capacitive coupling of selected amounts between said antenna element and said pumped grounded element, said change detecting device includes an operational amplifier having first and second inputs; means for creating a control signal between said pumped grounded element and said antenna; means for directing said control signal to said first input and means for creating a reference signal at said second input.

3. A capacitor detector device as defined in claim 2 including means for creating a null signal having said preselected frequency and a selected amplitude generally corresponding to the amplitude of said control signal when said nominal capacitance exists in said protected zone; and means for directing said null signal to said second input.

4. A capacitor detector device as defined in claim 3 including means for adjusting said selected amplitude.

5. A capacitor detector device as defined in claim 2 including means for creating a null signal having said preselected frequency and generally in phase with said control signal; and, means for directing said null signal to said second input.

6. A capacitor detector device for detecting the change of capacitance in a protected zone, said device comprising: an antenna element adapted to be mounted in spaced relationship with a grounded element to define said protected zone between said elements and having a nominal capacitance therebetween which capacitance is changed upon intrusion of an object to be detected; an oscillator means independent of said antenna element and connected to said grounded element for creating a first operating signal alternating with respect to said grounded element at a preselected frequency; a voltage control device for maintaining a selected voltage between said first operating signal and an internal instrument ground whereby said instrument ground is a second operating signal which alternates with said first operating signal and is displaced therefrom by said selected voltage; means for subjecting said antenna to one of said operating signals; means for creating a control signal on said antenna at said preselected frequency and by the voltage relationship between said one of said operating signals and said grounded element; and means for detecting changes of a selected amount in the magnitude of said control signal.

7. A capacitor detector device for detecting the change of capacitance in a protected zone, said device comprising: an antenna element adapted to be mounted in spaced relationship with a grounded element to define said protected zone between said elements and having a nominal capacitance therebetween which capacitance is changed upon intrusion of an object to be detected; an oscillator means connected to said grounded element for creating a first operating signal alternating with respect to said grounded element at a preselected frequency; a voltage control device for maintaining a selected voltage between said first operating signal and an internal instrument ground whereby said instrument ground is a second operating signal which alternates with said first operating signal and is displaced therefrom by said selected voltage; means for subjecting said antenna to one of said operating signals; means for creating a control signal on said antenna at said preselected frequency and by the voltage relationship between said one of said operating signals and said grounded element; and means for detecting changes of a selected amount in the magnitude of said control signal, said change detecting means including an operational amplifier having first and second inputs; means for directing said control signal into said first inputs and means for creating a reference signal at said second input.

8. A capacitor detector device as defined in claim 7 including means for creating a null signal having said preselected frequency and a selected amplitude generally corresponding to the amplitude of said control signal when said nominal capacitance exists in said protected zone; and means for directing said null signal to said second input.

9. A capacitor detector device as defined in claim 8 wherein said operational amplifier is a Norton current responsive operational amplifier with said first input being the inverted input and the second input being the non-inverted input.

10. A capacitor detector device as defined in claim 9 wherein one of said operating signals is applied to said second input.

11. A capacitor detector device as defined in claim 8 including means for adjusting said selected amplitude.

* * * * *